(12) United States Patent
Takada et al.

(10) Patent No.: US 11,968,545 B2
(45) Date of Patent: Apr. 23, 2024

(54) USER EQUIPMENT AND COMMUNICATION METHOD

(71) Applicant: NTT DOCOMO, INC., Tokyo (JP)

(72) Inventors: Takuma Takada, Tokyo (JP); Hiroki Harada, Tokyo (JP); Naoki Fujimura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 326 days.

(21) Appl. No.: 17/441,561

(22) PCT Filed: Mar. 29, 2019

(86) PCT No.: PCT/JP2019/014348
§ 371 (c)(1),
(2) Date: Sep. 21, 2021

(87) PCT Pub. No.: WO2020/202397
PCT Pub. Date: Oct. 8, 2020

(65) Prior Publication Data
US 2022/0174507 A1 Jun. 2, 2022

(51) Int. Cl.
*H04W 16/28* (2009.01)
*H04W 24/08* (2009.01)

(52) U.S. Cl.
CPC .......... *H04W 16/28* (2013.01); *H04W 24/08* (2013.01)

(58) Field of Classification Search
CPC ..... H04W 16/28; H04W 24/08; H04W 24/10; H04L 5/0098; H04L 5/0023; H04L 5/001; H04L 5/0048; H04B 7/088; H04B 7/0665
See application file for complete search history.

(56) References Cited

U.S. PATENT DOCUMENTS

| 2015/0215929 A1* | 7/2015 | Damnjanovic | H04W 72/21 370/241 |
| 2015/0334603 A1* | 11/2015 | Uchino | H04L 5/0057 370/331 |

(Continued)

FOREIGN PATENT DOCUMENTS

WO 2020/164610 A1 8/2020

OTHER PUBLICATIONS

Office Action issued in Chilean Patent Application No. 202102481, dated Dec. 30, 2022 (31 pages).

(Continued)

*Primary Examiner* — Ayaz R Sheikh
*Assistant Examiner* — Tarell A Hampton
(74) *Attorney, Agent, or Firm* — Osha Bergman Watanabe & Burton LLP (57) ABSTRACT

A user equipment includes a receiving unit that receives a reference signal from a secondary cell; a transmitting unit that transmits a result of a measurement of the reference signal; and a control unit that selects, when the secondary cell is deactivated after the transmitting unit transmits the result of the measurement and the secondary cell is reactivated, and when a time interval from a timing at which the transmitting unit transmits the result of the measurement until a timing at which the secondary cell is reactivated is within a predetermined time interval, a receiving beam that is applied to the secondary cell upon transmitting the result of the measurement by the transmitting unit, as a receiving beam to be applied to the reactivated secondary cell.

5 Claims, 6 Drawing Sheets

(56) References Cited

U.S. PATENT DOCUMENTS

| | | | |
|---|---|---|---|
| 2018/0007731 A1 | 1/2018 | Park et al. | |
| 2019/0268053 A1* | 8/2019 | John Wilson | H04B 7/0695 |
| 2020/0029316 A1* | 1/2020 | Zhou | H04W 74/0833 |
| 2020/0314671 A1* | 10/2020 | He | H04W 72/23 |
| 2020/0389883 A1* | 12/2020 | Faxér | H04L 5/0053 |
| 2021/0281305 A1* | 9/2021 | Grant | H04W 24/10 |
| 2021/0297886 A1* | 9/2021 | Chen | H04W 72/046 |

OTHER PUBLICATIONS

Office Action issued in the counterpart Indian Application No. 202117041309, dated Feb. 17, 2023 (6 pages).

Huawei, HiSilicon; "Low latency of Scell activation"; 3GPP TSG RAN WG1 Meeting #96, R1-1901581; Athens, Greece, Feb. 25-Mar. 1, 2019 (4 pages).

Extended European Search Report issued in counterpart European Patent Application No. 19922577.2, dated Oct. 12, 2022 (13 pages).

ASUSTeK; "Remaining issues on beam management"; 3GPP TSG RAN WG1 Meeting #93, R1-1807210; Busan, Korea; May 21-25, 2018 (9 pages).

Office Action issued in Chilean Application No. 2021-02481; dated Sep. 11, 2023 (34 pages).

International Search Report issued in PCT/JP2019/014348, dated Jun. 11, 2019 (3 pages).

Written Opinion of the International Searching Authority issued in PCT/JP2019/014348, dated Jun. 11, 2019 (3 pages).

3GPP TS 38.214 V15.4.0; "3rd Generation Partnership Project; Technical Specification Group Radio Access Network; NR; Physical layer procedures for data (Release 15)"; Dec. 2018 (12 pages).

3GPP TS 38.321 V15.4.0; "3rd Generation Partnership Project; Technical Specification Group Radio Access Network; NR; Medium Access Control (MAC) protocol specification (Release 15)"; Dec. 2018 (12 pages).

* cited by examiner

| QCL Types | QCL parameters |
|---|---|
| A | Doppler shift, Doppler spread, average delay, delay spread |
| B | Doppler shift, Doppler spread |
| C | Average delay, Doppler shift |
| D | Spatial Rx parameter (sQCL) |

FIG.7

USER EQUIPMENT AND COMMUNICATION METHOD

TECHNICAL FIELD

The present invention relates to user equipment and a communication method in a radio communication system.

BACKGROUND ART

In regard to the New Radio (NR), in order to secure coverage for communication using radio waves in a high frequency band, beamforming is applied to transmission of data on a Physical Downlink Shared Channel (PDSCH), transmission of a control signal on a Physical Downlink Control Channel (PDCCH), transmission of a synchronization signal and broadcast information on a Synchronization Signal/Physical Broadcast Channel (SS/PBCH) Block (SSB), and transmission of a reference signal (Channel State Information Reference Signal (CSI-RS)/Demodulation Reference Signal (DMRS)).

Beam management or beam control is important for communication using beams. For example, if there are two beams, a base station is to signal to user equipment which beam is used to transmit a signal. A Transmission Configuration Indication (TCI) state is specified to signal to user equipment a beam to be used or to signal to user equipment switching of a beam to be used.

PRIOR ART DOCUMENT

Non-Patent Document

Non-Patent Document 1: 3GPP TS 38.214 V15.4.0 (2018 December)
Non-Patent Document 2: 3GPP TS 38.321 V15.4.0 (2018 December)

SUMMARY OF THE INVENTION

Problem to be Solved by the Invention

Under 3GPP RAN4 Radio Resource Management (RRM), allowed time is specified as a time period within which reactivation of a deactivated Secondary Cell (SCell) is to be completed. Specifically, it is specified that user equipment 20 should be able to transmit, to a target SCell, an accurate Channel State Information (CSI) within x seconds after the user equipment 20 has received an SCell activation command at slot n. There is a need for a technique that can reduce time for reactivation of an SCell after deactivation of the SCell.

Means for Solving the Problem

According to an aspect of the present invention, there is provided a user equipment including a receiving unit that receives a reference signal from a secondary cell; a transmitting unit that transmits a result of a measurement of the reference signal; and a control unit that selects, when the secondary cell is deactivated after the transmitting unit transmits the result of the measurement and the secondary cell is reactivated, and when a time interval from a timing at which the transmitting unit transmits the result of the measurement until a timing at which the secondary cell is reactivated is within a predetermined time interval, a receiving beam that is applied to the secondary cell upon transmitting the result of the measurement by the transmitting unit, as a receiving beam to be applied to the reactivated secondary cell.

Advantage of the Invention

According to an embodiment, there is provided a technique that can reduce time from deactivation until completion of SCell activation.

EMBODIMENTS OF THE INVENTION

In the following, embodiments of the present invention are described with reference to the drawings. The embodiments described below are merely examples, and embodiments to which the present invention is applied are not limited to the following embodiments.

In the embodiments of the present invention described below, terms used in the existing LTE are used, such as Synchronization Signal (SS), Primary SS (PSS), Secondary SS (SSS), Physical Broadcast channel (PBCH), and Physical Random Access channel (PRACH). This is for convenience of description, and signals and functions similar to these may be referred to by other names. The above-described terms in NR correspond to NR-SS, NR-PSS, NR-SSS, NR-PBCH, NR-PRACH, and the like. However, even if a signal is used for NR, the signal is not always explicitly indicated as "NR-."

In embodiments of the present invention, a duplex method may be a Time Division Duplex (TDD) method, a Frequency Division Duplex (FDD) method, or any other method (e.g., Flexible Duplexing).

In the following description, a method of transmitting a signal using a transmit beam may be digital beamforming, in which a signal multiplied by a precoding vector (precoded with the precoding vector) is transmitted, or analog beamforming, in which beamforming is implemented using a variable phase shifter in an RF (Radio Frequency) circuit. Similarly, a method of receiving a signal using a receiving beam may be digital beamforming, in which a received signal is multiplied by a predetermined weight vector, or analog beamforming, in which beamforming is implemented using a variable phase shifter in an RF circuit. Hybrid beamforming combining digital beamforming and analog beamforming may be applied to transmission and/or reception. Transmitting a signal using a transmit beam may be transmitting the signal with a specific antenna port. Similarly, receiving a signal using a receiving beam may be receiving the signal with a specific antenna port. An antenna port refers to a logical antenna port or a physical antenna port defined by the 3GPP standard. The above-described precoding or beamforming may be referred to as a precoder, a spatial domain filter, or the like.

Note that a method of forming a transmit beam and receiving beam is not limited to the above-described methods. For example, in a base station 10 or user equipment 20 having multiple antennas, a method of changing an angle of each antenna may be used, a method of using a precoding vector and a method of changing the angle of the antenna may be used, a method of switching different antenna panels may be used, a method of combining multiple antenna panels may be used, or other methods may be used. For example, in a high frequency band, a plurality of mutually different transmit beams may be used. The use of multiple transmit beams is called multi-beam operation, and the use of a single transmit beam is called single-beam operation.

In the embodiments of the present invention, "configuring" a radio parameter or the like may include pre-configuring a predetermined value, or configuring the radio parameter signalled from the base station 10 or the user equipment 20.

Figure 1:
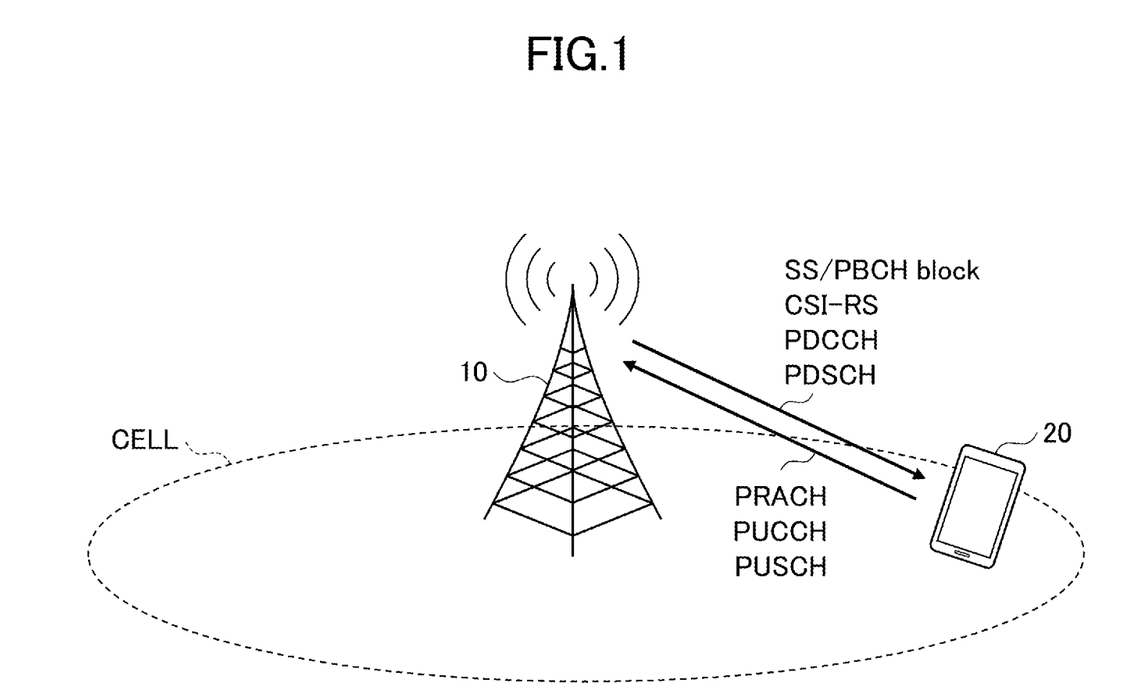
FIG. 1 is a configuration diagram of a communication system according to an embodiment.

FIG. 1 is a diagram illustrating a radio communication system according to an embodiment of the present invention. The radio communication system in an embodiment of the present invention includes a base station 10 and user equipment 20, as depicted in FIG. 1. In FIG. 1, one base station 10 and one unit of the user equipment 20 are depicted. However, this is an example, and, for each of the devices, there may be a plurality of devices.

The base station 10 is a communication device that provides one or more cells and performs radio communication with the user equipment 20. A physical resource of a radio signal is defined in a time domain and a frequency domain, the time domain may be defined by a number of OFDM symbols, and the frequency domain may be defined by a number of sub-carriers or a number of resource blocks. The base station 10 transmits a synchronization signal and system information to the user equipment 20. A synchronization signal is, for example, NR-PSS and NR-SSS. A part of system information is transmitted, for example, by NR-PBCH, which is also called broadcast information. A synchronization signal and broadcast information may be periodically transmitted as an SS block (SS/PBCH block) consisting of a predetermined number of OFDM symbols. For example, the base station 10 transmits a control signal or data in DL (Downlink) to the user equipment 20 and receives a control signal or data in UL (Uplink) from the user equipment 20. The base station 10 and the user equipment 20 are capable of transmitting and receiving signals while performing beamforming. For example, as shown in FIG. 1, a reference signal transmitted from the base station 10 includes a Channel State Information Reference Signal (CSI-RS), and a channel transmitted from the base station 10 includes Physical Downlink Control Channel (PDCCH) and Physical Downlink Shared Channel (PDSCH).

The user equipment 20 is a communication device provided with a radio communication function, such as a smartphone, a cellular phone, a tablet, a wearable terminal, and a communication module for Machine-to-Machine (M2M). The user equipment 20 utilizes various communication services provided by a radio communication system by receiving a control signal or data in DL from the base station 10 and transmitting a control signal or data in UL to the base station 10. For example, as illustrated in FIG. 1, channels transmitted from the user equipment 20 include Physical Uplink Control Channel (PUCCH) and Physical Uplink Shared Channel (PUSCH).

In the New Radio (NR), in order to secure coverage for communications using radio waves in a high frequency band, beamforming is applied to transmission of data in a Physical Downlink Shared Channel (PDSCH), transmission of a control signal in a Physical Downlink Control Channel (PDCCH), transmission of a synchronization signal and broadcast information in a Synchronization Signal/Physical Broadcast Channel (SS/PBCH) Block (SSB), and transmission of a reference signal (Channel State Information Signal (CSI-RS)/Demodulation Reference Signal (DMRS)).

For example, in Frequency Range 2 (FR2), i.e., in a frequency band of millimeter wave greater than or equal to 24 GHz, 64 beams can be used, and in Frequency Range 1 (FR1), i.e., in a sub-6 GHz frequency band, 8 beams can be used.

For performing communication using a beam, beam management or beam control is important. For example, if there are two beams, the base station 10 may need to signal to the user equipment 20 which beam is used to transmit the signal. A Transmission Configuration Indication (TCI) state is specified so as to transmit, to the user equipment 20, a notification of the beam to be used, or to transmit, to the user equipment 20, a notification of switching of a beam to be used.

Details to be signaled by a TCI state include Quasi-Co-Location (QCL) that indicates it is possible to assume that one reference signal (RS) and one channel are identical radio channels, or the one reference signal (RS) and the one channel have the same radio property (the same beam). QCL is specified in Non-Patent Document 1.

For example, the fact that a reference signal, such as a CSI-RS (or SS/PBCH) and a PDSCH that is a channel for transmitting data are QCL implies that the reference signal and the data have a relationship such that the reference signal and the data are transmitted with a same beam.

Figure 2:
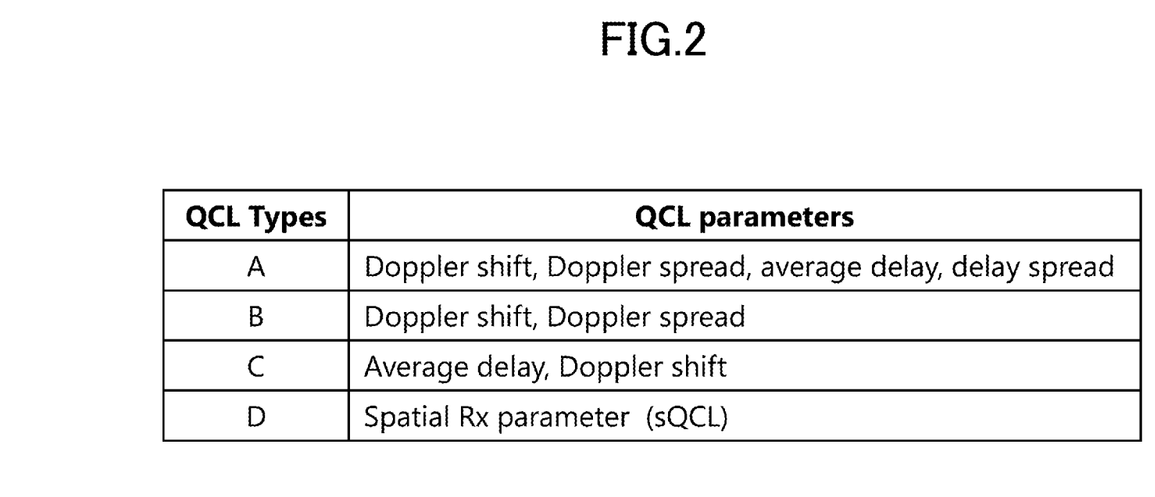
FIG. 2 is a diagram illustrating an example of types of QCL.

As shown in FIG. 2, four types of QCL are defined from A to D. For signaling beam information, QCL Type D is mainly used. QCL Type D implies that transmissions by the same beam. Other than that, for example, QCL Type A is used for signaling colocation, for example, whether the base stations 10 are located at a same location.

Beam Management Function

In NR, a beam management function is specified for selecting an optimum pair of a beam used by the base station 10 for transmission and a beam used by the user equipment for reception.

Figure 3:
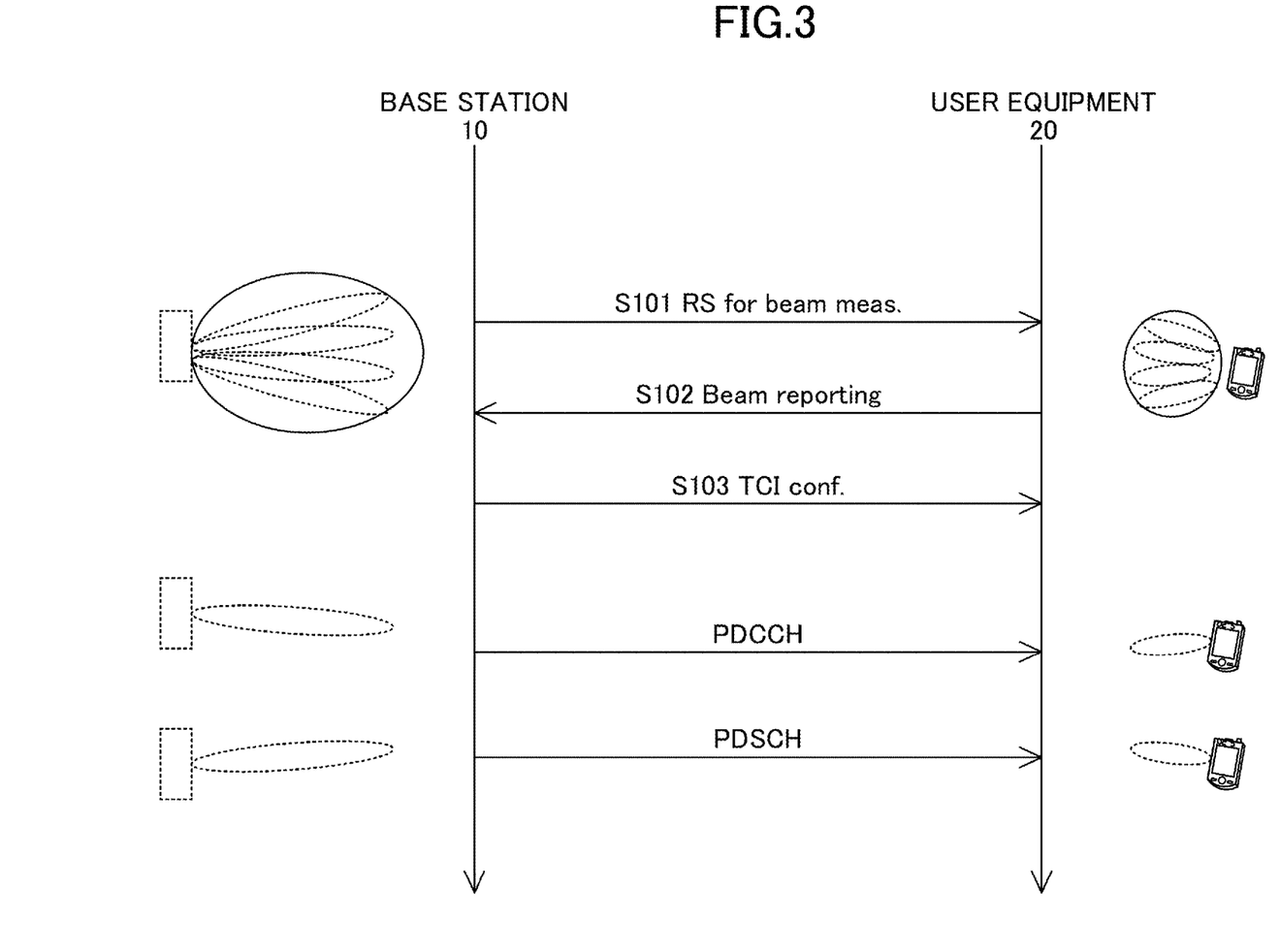
FIG. 3 is a diagram illustrating an example of an NR beam management process.

FIG. 3 is a diagram illustrating an example of NR beam management processing. In step S101 of FIG. 3, the base station 10 signals, to the user equipment 20, a configuration of a reference signal and a configuration of reporting. In step S102, the user equipment 20 measures the quality of a beam (RSRP: Reference Signal Received Power) using a reference signal transmitted in the signaled resource, and the user equipment 20 transmits the measured quality to the base station 10.

The base station 10 calculates an optimum beam based on quality of each beam reported from the user equipment 20, and the base station 10 signals, to the user equipment 20, information indicating that data and/or a control signal is transmitted with the calculated beam, as a TCI state (step S103).

As a function that can be used in a beam management procedure, an RS resource configuration function, a Beam reporting function, and a Beam indication function are known, which are described below.

RS Resource Configuration Function

The RS resource configuration function is a function for configuring a reference signal used for beam management (beam quality reporting: beam reporting/L1-RSRP reporting) by RRC signaling. Here, as a reference signal used for beam quality reporting, SSB or CSI-RS can be configured. Furthermore, supported periodicities of a CSI-RS include, aperiodic, semi-persistent, and periodic. Furthermore, as a function of optimizing the receiving beam (Rx beam) in the user equipment 20, repetition in which the base station 10 repeatedly transmits a CSI-RS with the same beam, can be configured by RRC signaling (CSI-RS with repetition on or off).

Beam Reporting Function

A Beam reporting function is a function for reporting beam quality using the framework of the CSI-RS report. The user equipment 20 reports beam quality to the base station 10. Supported reporting periodicities include, aperiodic, semi-persistent, and periodic.

Beam Indication Function

By the beam indication function, a Transmission Configuration Indication-state (TCI-state) can be configured, which is for signaling, from a network to the user equipment 20, information indicating the beams to be used by the base station 10 for transmission of a reference signal, data, and a control signal.

TCI State Configuration Method/Switching Method

Figure 4:
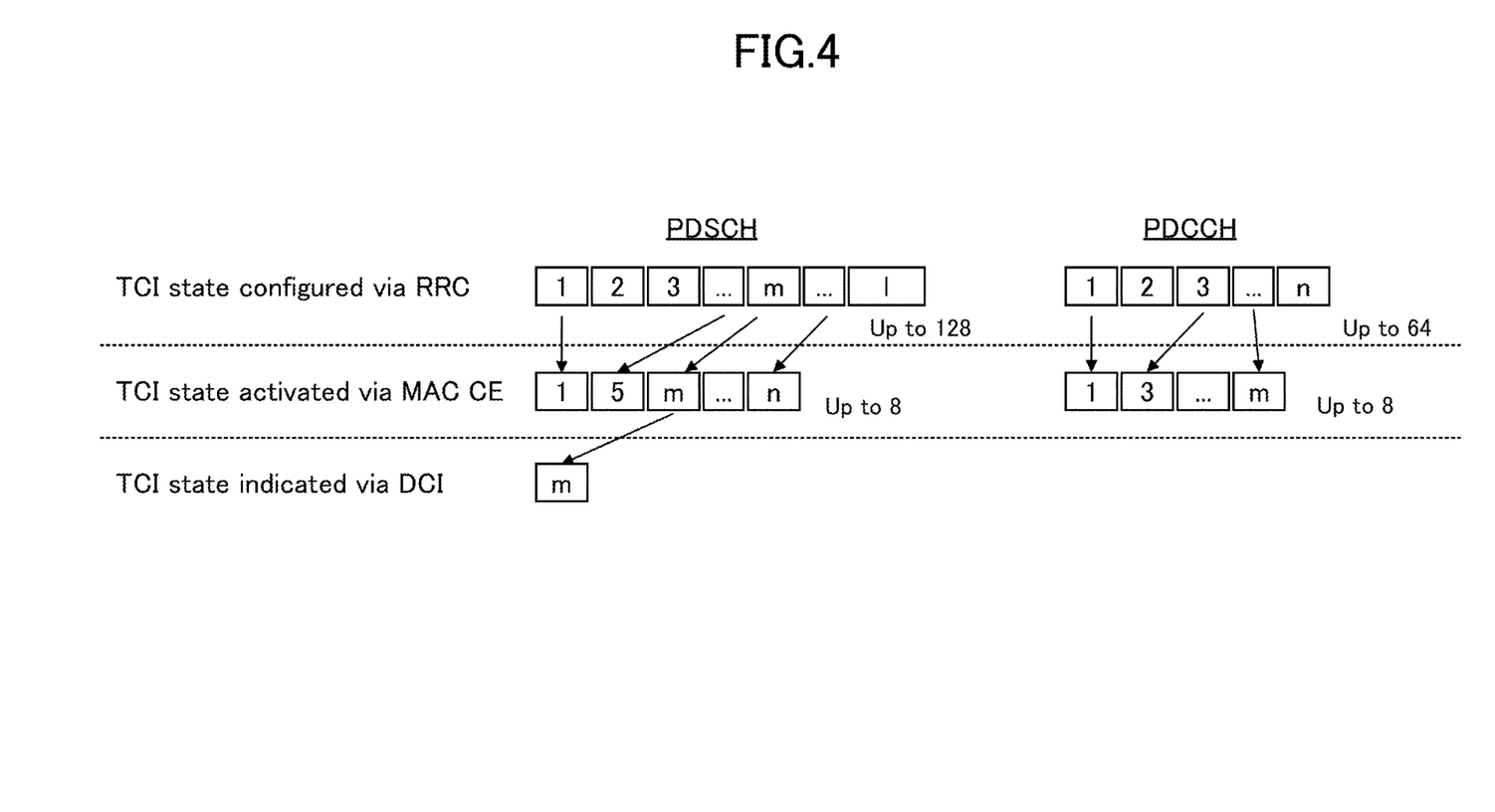
FIG. 4 is a diagram illustrating an example of a TCI state configured in user equipment.

FIG. 4 is a diagram illustrating an example of a TCI state configured for the user equipment 20.

By Radio Resource Control (RRC) signaling, up to 128 TCI states can be configured for PDSCH in the user equipment 20. Additionally, by RRC signaling, up to 64 TCI states can be configured for PDCCH in the user equipment 20 (The TCI states for PDCCH are a subset of the TCI states configured for PDSCH).

With respect to the TCI states for the PDCCH, it is possible to activate up to eight TCI states by a Medium Access Control Control Element (MAC CE) out of the TCI states configured by the RRC signaling in the user equipment 20, and it is possible to deactivate the activated TCI state. The user equipment 20 monitors the active TCI state.

With respect to the TCI states for the PDSCH, it is possible to activate up to eight TCI states by the Medium Access Control Control Element (MAC CE) out of the TCI states configured by the RRC signaling in the user equipment 20, and it is possible to deactivate the activated TCI state. Furthermore, the base station 10 can specify a TCI state of the PDSCH by Downlink Control Information (DCI) among the TCI states activated by the MAC CE. In this case, the user equipment 20 receives data transmitted by PDSCH assuming the TCI state designated by the DCI.

The operation of the user equipment 20 during switching of the TCI state is currently discussed in RAN 4 of the 3GPP.

In Radio Resource Management (RRM) in RAN 4 of 3GPP, allowed time is specified until completion of activation of a deactivated Secondary Cell (SCell).

Specifically, it is specified that the user equipment 20 shall be able to send an accurate Channel State Information (CSI) report to a target SCell x seconds after the user equipment 20 receives an SCell activation command at slot n.

Here, the-above described x seconds include the following times:
- a time for the user equipment 20 to decode a Medium Access Control (MAC) command received at the slot n;
- a time for detection of a Synchronization Signal (PSS)/a Secondary Synchronization Signal (SSS) and time and frequency synchronization; and
- a delay time related to a CSI report that occurs due to Channel State Information (CSI)-Reference Signal (RS) receiving timing, report transmission allowed timing, and so forth.

In the case of NR, the user equipment 20 receives Physical Downlink Shared Channel (PDSCH) and Physical Downlink Control Channel (PDCCH) based on information on a TCI state signaled from the base station 10.

Specifically, the base station 10 causes the user equipment 20 to report Layer 1-Reference Signal Received power (L1-RSRP) based on a Synchronization Signal Block (SSB) and/or a CSI-RS, and the base station 10 signals, to the user equipment 20, which SSB and/or CSI-RS is the same radio channel with PDSCH and PDCCH (transmitted with the same beam), as a Transmission Configuration Indication (TCI) state.

Problem

It is specified in Non-Patent Document 2 that L1-RSRP and CSI reporting operations are not performed for a deactivated SCell (L1-RSRP measurement is a part of CSI reporting).

1> if the SCell is deactivated:
2> not transmit SRS on the SCell;
2> not report CSI for the SCell;
2> not transmit on UL-SCH on the SCell;
2> not transmit on RACH on the SCell;
2> not monitor the PDCCH on the SCell;
2> not monitor the PDCCH for the SCell;
2> not transmit PUCCH on the SCell.

Accordingly, at a moment at which a deactivated SCell is reactivated, L1-RSRP reporting from the user equipment 20 is not performed for the SCell. Thus, the base station 10 may be unable to determine which SSB or CSI-RS would be appropriate as a QCL resource (beam). As a result, the user equipment 20 may be unable to transmit a CSI report in a proper direction.

As for the above-described problem, even if the SCell is deactivated, the user equipment 20 performs Layer 3 (L3) measurement. Accordingly, it has been proposed to use a result of the L3 measurement in determining whether SSB or CSI-RS is appropriate as a QCL resource. However, this proposal has the following problems.

If L3 measurement is configured as event trigger reporting, the user equipment 20 does not report L3 measurement unless an event occurs. Accordingly, the base station 10 is unable to obtain an L3 measurement report unless an event occurs.

In L3 measurement, a measurement result is calculated by averaging measurement results using multiple samples. Accordingly, a receiving beam of the user equipment 20 that is determined to be optimal based on the L3 measurement may differ from a receiving beam of the user equipment 20 that is determined to be optimal in the L1-RSRP measurement.

When the SCell is deactivated and re-activated, by clarifying a condition on a receiving beam that can be applied by the user equipment 20, efficient network control and optimization of communication between the base station 10 and the user equipment 20 can be achieved.

Method 1

A condition is clarified with which the user equipment 20 can determine, based on information measured by the user equipment 20 before an SCell is deactivated, a receiving beam to be applied when the SCell is reactivated. If the condition is satisfied, the user equipment 20 may apply a receiving beam to the reactivated SCell while assuming a TCI state or QCL that is the same as the TCI state or the QCL employed before deactivation of the SCell.

For example, if the user equipment 20 has measured L1-RSRP and reported a measurement result to the base station 10 prior to deactivation of the SCell, if a time interval from a timing of the measurement and reporting to a timing at which the SCell is reactivated is within y seconds, the user equipment 20 may apply, to the reactivated SCell, the receiving beam used at the timing of the measurement and reporting. In this case, the user equipment 20 does not need to perform L1-RSRP reporting and UE Rx beam sweeping. Alternatively, user equipment 20 may complete L1-RSRP reporting and UE Rx beam sweeping with a number of times of measurements (and/or reports) that is less than usual.

In addition to L1-RSRP, one or more of the following may be applied to the measurement/report made by the user equipment 20 prior to deactivation of the SCell:
  L3 measurement;
  Rx beam measurement (measured by CSI-RS for which "repetition" is configured);
  Radio Link Monitoring;
  Beam Failure Detection, and Candidate Beam Detection.

The above-described "y seconds" may be switched depending on which of the above-described measurements is applied. Furthermore, "y seconds" may correspond to a TA timer.

Furthermore, for a measurement from among the above-described measurements, if the time interval from the last report prior to deactivation of the SCell until activation of the SCell is within y seconds, the base station 10 may configure a TCI state at the time of the last report prior to the deactivation of the SCell for the user equipment 20. In this case, if the base station 10 does not provide a configuration, the user equipment 20 may autonomously assume QCL (i.e., may assume that a transmit beam and a receiving beam that are the same as those prior to the deactivation of the SCell are applicable for communication with the activated SCell).

Note that, as a specific example of a case in which, for measurement among the above-described measurements, the time interval from the last report prior to the deactivation of the SCell until re-activation of the SCell exceeds y seconds, a case can be considered in which, for example, when the y seconds correspond to the TA timer, a timing at which the SCell is activated again is after expiration of the TA timer. In this case, the user equipment 20 may perform a random access procedure, and the user equipment 20 may perform CSI reporting while assuming that the SSB monitored during the random access procedure is QCL with PDCCH and PDSCH.

Method 2

The user equipment 20 may determine a receiving beam based on measurements made to the deactivated SCell, and after the SCell is activated again, the user equipment 20 may assume that the reference signals (RS) used for the measurement is QCL with the PDSCH and the PDCCH (i.e., may assume that the reference signal used for the measurement, a signal of PDSCH, and a signal of PDCCH are transmitted with the same beam), regardless of the TCI state. The user equipment 20 may perform CSI reporting after the SCell is activated based on the above-described assumption.

Specifically, the user equipment 20 may take over the reference signal and receiving beam used at the time of the last measurement, among measurements made by the user equipment 20 to the deactivated SCell, made by the user apparatus 20 prior to the activation of the SCell, regardless of whether the measurement is reported to the base station 10. In this case, the user equipment 20 may apply the reference signal and receiving beam, which are taken over, to the CSI reporting after the activation of the SCell.

As a measurement made by the user equipment on the activated SCell, for example, there is a L3 measurement.

For example, for a deactivated SCell, if the user equipment 20 performs L3 measurement, the user equipment 20 may take over the reference signal and received beam used during the last L3 measurement performed by the user equipment 20 prior to the re-activation of SCell, even if a result of the L3 measurement is not reported to the base station 10. In this case, the user equipment 20 may apply the reference signal and received beam, which are taken over, to the CSI reporting after the SCell is activated again.

Alternatively, the user equipment 20 may determine a receiving beam based on the measurement made to another serving cell, instead of the measurement made to the deactivated SCell.

For example, if, in addition to the deactivated SCell, there are a Primary Cell (PCell), a Primary Secondary Cell (PSCell), or an activated SCell in a frequency band that is the same as the frequency band of the deactivated SCell, the user equipment 20 may assume QCL based on a result of measurement on the PCell and/or PSCell, even if there is no signaling of a TCI state from the base station 10.

In this case, the measurements made to the other serving cells may be, for example, any of the following measurements:
  L3 measurement;
  L1-RSRP reporting;
  Rx beam measurement (measured on a CSI-RS for which "repetition" is configured);
  Radio Link Monitoring;
  Beam Failure Detection, and Candidate Beam Detection.

Device Configuration

Next, an example of the functional configuration of the base station 10 and the user equipment 20 for performing the processes and operations described above is described. The base station 10 and the user equipment 20 include functions for implementing the above-described embodiments. However, each of the base station 10 and the user equipment 20 may include only a part of the functions in the embodiments. Note that the base station 10 and the user equipment 20 may be collectively referred to as a communication device.

Base Station Apparatus 10

Figure 5:
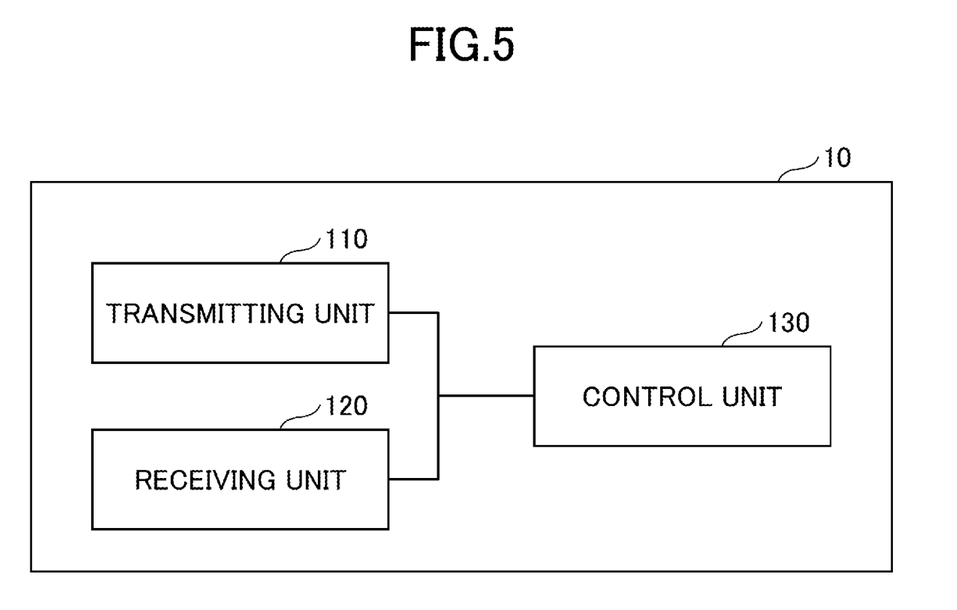
FIG. 5 is a diagram illustrating an example of a functional configuration of user equipment.

FIG. 5 is a diagram illustrating an example of the functional configuration of the base station 10. As illustrated in FIG. 5, the base station 10 includes a transmitting unit 110, a receiving unit 120, and a control unit 130. The functional configuration illustrated in FIG. 5 is merely one example. The functional division and names of functional units may be any division and names, provided that the operation according to the embodiments of the present invention can be performed.

The transmitting unit 110 includes a function for generating a transmit signal from transmit data, and the transmitting unit 110 transmits the transmit signal through radio. The receiving unit 120 receives various types of signals through radio, and the receiving unit 120 obtains a higher layer signal from the received physical layer signal. Furthermore, the receiving unit 120 includes a measurement unit that performs measurement of a received signal to obtain received power, and so forth.

The control unit 130 controls the base station 10. Note that a function of the control unit 130 related to transmission may be included in the transmitting unit 110 and a function of the control unit 130 related to reception may be included in the receiving unit 120.

In the base station 10, the control unit 130 calculates an optimum beam based on the quality of each beam reported from the user equipment 20, and the control unit 130 generates, as a TCI state, information indicating that data and/or control signals are transmitted with the calculated beam. The transmitting unit 110 transmits a signal including a TCI state to the user equipment 20.

Furthermore, in the base station 10, the transmitting unit 110 periodically transmits a plurality of reference signals (beams) such as a Beam Management Reference signal (BM-RS), and/or a Radio Link Monitoring Reference signal (RLM-RS), in addition to one beam for transmitting a signal of PDCCH and a signal of PDSCH.

User Equipment 20

Figure 6:
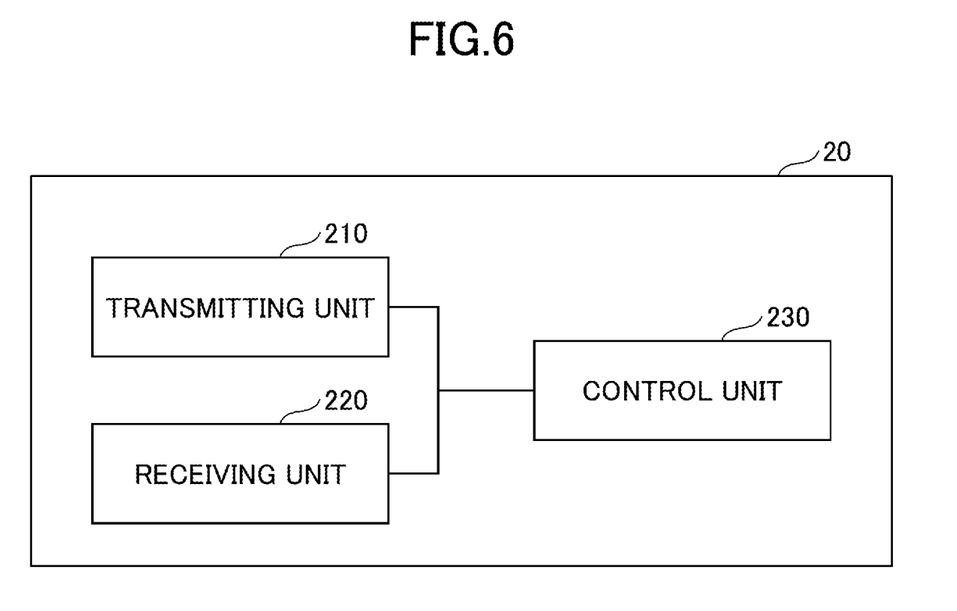
FIG. 6 is a diagram illustrating an example of a functional configuration of a base station.

FIG. 6 is a diagram illustrating an example of the functional configuration of the user equipment 20. As illustrated in FIG. 6, the user equipment 20 includes a transmitting unit 210, a receiving unit 220, and a control unit 230. The functional configuration illustrated in FIG. 6 is merely an example. The functional division and names of functional units may be any division and names, provided that the operation according to the embodiments can be performed.

The transmitting unit 210 includes a function for generating a signal to be transmitted to the base station 10 and transmitting the signal through radio. The receiving unit 220 includes a function for receiving various types of signals transmitted from the base station 10 and obtaining, for example, higher layer information from the received signals. The receiving unit 220 includes a measurement unit that measures a received signal to obtain a received power.

The control unit 230 controls the user equipment 20. The function of the control unit 230 related to transmission may be included in the transmitting unit 210, and the function of the control unit 230 related to reception may be included in the receiving unit 220.

In the user equipment 20, the receiving unit 220 measures quality of a beam (RSRP: Reference Signal Received Power) using a reference signal transmitted by a resource signaled by the base station 10, and the transmitting unit 210 transmits the measured quality to the base station 10.

Furthermore, in the user equipment 20, if the control unit 230 measures the L1-RSRP and reports the measurement result to the base station 10 before the SCell is deactivated, the user equipment 20 may apply a received beam at the time of measuring and reporting to the activated SCell, if a time interval from the timing of measuring and reporting to the timing at which the SCell is activated again is less than or equal to y seconds. In this case, the control unit 230 need not perform L1-RSRP reporting and UE Rx beam sweeping. Alternatively, the control unit 230 may complete the L1-RSRP reporting and UE Rx beam sweeping with a number of times of measurement (and/or reporting) that is less than a normal number of times.

Furthermore, in addition to L1-RSRP, one or more of the following may be applied to the measurement/reporting performed by the control unit 230 prior to deactivation of the SCell.

L3 measurement.
Rx beam measurement (measurement in a CSI-RS for which "repetition" is configured).
Radio Link Monitoring.
Beam Failure Detection, Candidate Beam Detection.

The control unit 230 may determine a receiving beam based on measurement made to the deactivated SCell, and, after the SCell is reactivated, the control unit 230 may assume that the reference signal (RS) used for the measurements is QCL with a PDSCH and a PDCCH regardless of the TCI state (i.e., assume that a reference signal used for the measurements, a PDSCH signal, and a PDCCH signal are transmitted with the same beam). The control unit 230 may perform CSI reporting based on the above-described assumptions after the SCell has been activated.

Alternatively, the control unit 230 may determine a receiving beam based on measurements made to other serving cells, instead of measurements made to the deactivated SCell. For example, if, in addition to the deactivated SCell, there is a Primary Cell, a Primary Secondary Cell, or an Activated SCell in a frequency band that is the same as the frequency band of the deactivated SCell, the control unit 230 may assume QCL based on the result of measurement in the PCll and/or PSCl and/or SCell without signaling of the TCI state from the base station 10.

Hardware Configuration

The block diagrams (FIG. 5 to FIG. 6) used for the description of the above embodiments show blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire or radio) and using these multiple devices. The functional block may be implemented by combining software with the above-described one device or the above-described plurality of devices. Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and so forth. For example, a functional block (component) that functions to transmit is called a transmitting unit or a transmitter. In either case, as described above, the implementation method is not particularly limited.

Figure 7:
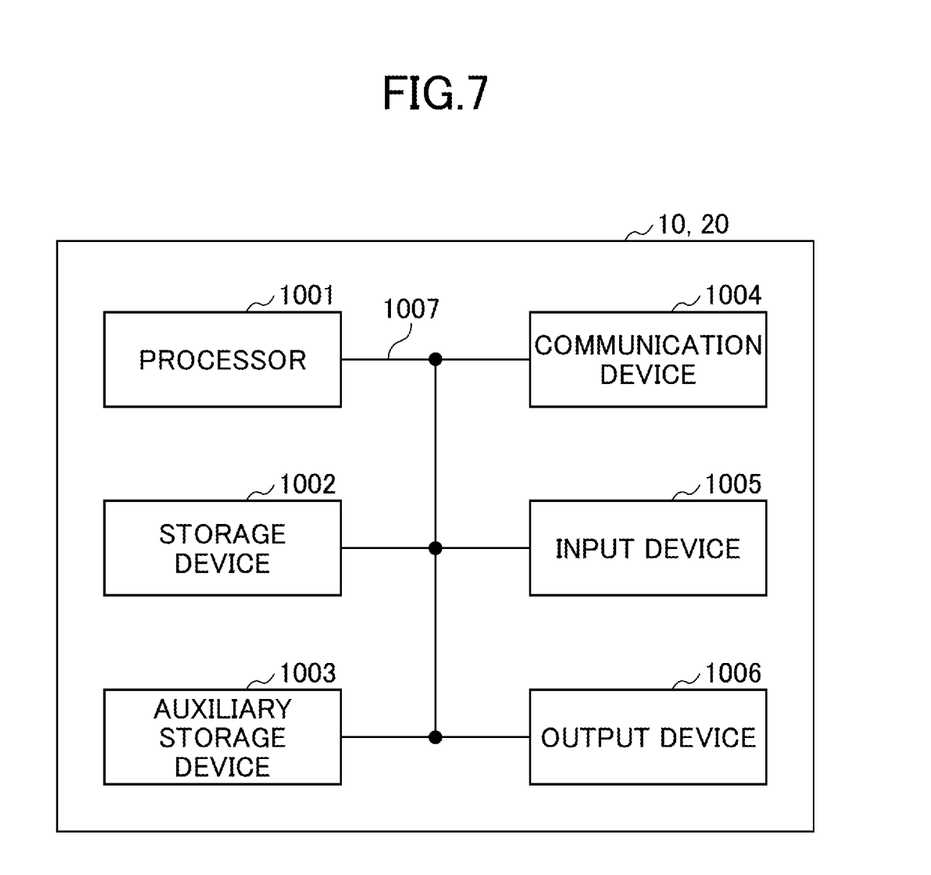
FIG. 7 is a diagram illustrating an example of a hardware configuration of user equipment and a base station.

For example, the base station 10 and the user equipment 20 according to an embodiment of the present invention may function as computers performing the process of the radio communication according to the embodiment of the present invention. FIG. 7 is a diagram illustrating an example of a hardware configuration of the base station 10 and the user equipment 20 according to the embodiment. Each of the above-described base station 10 and user equipment 20 may be physically configured as a computer device including a processor 1001, a memory 1002, a storage 1003, a communication device 1004, an input device 1005, an output device 1006, a bus 1007, and so forth.

Note that, in the following description, the term "device" can be replaced with a circuit, a device, a unit, and so forth. The hardware configuration of the base station 10 and the user equipment 20 may be configured to include one or more of the devices depicted in the figure, which are indicated by 1001 through 1006, or may be configured without some devices.

Each function of the base station 10 and the user equipment 20 is implemented by loading predetermined software (program) on hardware, such as the processor 1001 and the memory 1002, so that the processor 1001 performs computation and controls communication by the communication device 1004, and at least one of reading and writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, and so forth.

Additionally, the processor 1001 reads a program (program code), a software module, data, or the like from at least one of the storage 1003 and the communication device 1004 to the memory 1002, and executes various processes according to these. As the program, a program is used which causes a computer to execute at least a part of the operations described in the above-described embodiment. For example, the control unit 130 of the base station 10 may be implemented by a control program that is stored in the memory 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The memory 1002 is a computer readable storage medium, and, for example, the memory 1002 may be formed of at least one of a Read Only Memory (ROM), an Erasable Programmable ROM (EPROM), an Electrically Erasable Programmable ROM (EEPROM), a Random Access Memory (RAM), and the like. The memory 1002 may be referred to as a register, a cache, a main memory (main storage device), or the like. The memory 1002 may store a program (program code), a software module, and so forth, which can be executed for implementing the radio communication method according to the embodiments of the present disclosure.

The storage 1003 is a computer readable storage medium and may be formed of, for example, at least one of an optical disk, such as a Compact Disc ROM (CD-ROM), a hard disk drive, a flexible disk, an optical magnetic disk (e.g., a compact disk, a digital versatile disk, a Blu-ray (registered trademark) disk), a smart card, a flash memory (e.g., a card, a stick, a key drive), a floppy (registered trademark) disk, a magnetic strip, and so forth. The storage 1003 may be referred to as an auxiliary storage device. The above-described storage medium may be, for example, a database including at least one of the memory 1002 and the storage 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, or the like. The communication device 1004 may be configured to include, for example, a high frequency switch, a duplexer, a filter, a frequency synthesizer, and the like, to implement at least one of frequency division duplex (FDD: Frequency Division Duplex) and time division duplex (TDD: Time Division Duplex).

The input device 1005 is an input device (e.g., a keyboard, mouse, microphone, switch, button, or sensor) that receives an external input. The output device 1006 is an output device (e.g., a display, speaker, or LED lamp) that implements an external output. The input device 1005 and the output device 1006 may have an integrated configuration (for example, a touch panel).

Each device, such as the processor 1001 and the memory 1002, is also connected by the bus 1007 for communicating information. The bus 1007 may be formed of a single bus or may be formed of different buses between devices.

The base station 10 and the user equipment 20 may each include hardware, such as a microprocessor, a digital signal processor (DSP: Digital Signal Processor), an Application Specific Integrated Circuit (ASIC), a Programmable Logic Device (PLD), and a Field Programmable Gate Array (FPGA), which may implement some or all of the functional blocks. For example, processor 1001 may be implemented using at least one of these hardware components.

Conclusion of the Embodiments

In this specification, at least the user equipment and the communication method described below are disclosed.

A user equipment including a receiving unit that receives a reference signal from a secondary cell; a transmitting unit that transmits a result of a measurement of the reference signal; and a control unit that selects, when the secondary cell is deactivated after the transmitting unit transmits the result of the measurement and the secondary cell is reactivated, and when a time interval from a timing at which the transmitting unit transmits the result of the measurement until a timing at which the secondary cell is reactivated is within a predetermined time interval, a receiving beam that is applied to the secondary cell upon transmitting the result of the measurement by the transmitting unit, as a receiving beam to be applied to the reactivated secondary cell.

With the above-described configuration, the user equipment can select a receiving beam by using a measurement result of a measurement performed for selecting the receiving beam in the past, without performing a measurement for selecting a receiving beam again. Accordingly, the time required for reactivating the deactivated secondary cell can be reduced.

The receiving unit may measure the deactivated secondary cell, and, when the time interval from the timing of transmitting the result of the measurement to the timing at which the secondary cell is reactivated exceeds the predetermined time interval, the control unit may select a receiving beam applied by the receiving unit for measuring the deactivated secondary cell immediately before the secondary cell is reactivated, as the receiving beam to be applied to the reactivated secondary cell.

Upon detecting that the time interval from the timing at which the transmitting unit transmits the result of the measurement to the timing at which the secondary cell is reactivated exceeds the predetermined time interval, the control unit may execute a random access procedure.

The receiving unit may measure the deactivated secondary cell, and the control unit may select a receiving beam to be applied to the reactivated secondary cell based on a result of the measurement by the receiving unit.

A communication method executed by a user equipment, the method including receiving a reference signal from a secondary cell; transmitting a result of a measurement of the reference signal; and selecting, when the secondary cell is deactivated after transmitting the result of the measurement and the secondary cell is reactivated, and when a time interval from a timing of transmitting the result of the measurement until a timing at which the secondary cell is reactivated is within a predetermined time interval, a receiving beam that is applied to the secondary cell upon transmitting the result of the measurement, as a receiving beam to be applied to the reactivated secondary cell.

Supplemental Embodiments

While the embodiments of the present invention are described above, the disclosed invention is not limited to the described embodiments, and those skilled in the art will appreciate various alterations, modifications, alternatives, and substitutions. Descriptions are provided using specific numerical examples to facilitate understanding of the invention, but, unless as otherwise specified, these values are merely examples and any suitable value may be used. Classification of the items in the above descriptions is not essential to the present invention, and the items described in two or more items may be used in combination as needed, or the items described in one item may be applied (unless inconsistent) to the items described in another item. The boundaries of functional units or processing units in the functional block diagram do not necessarily correspond to the boundaries of physical components. An operation by a plurality of functional units may be physically performed by one component or an operation by one functional unit may be physically executed by a plurality of components. For the processing procedures described in the embodiment, the order of processing may be changed as long as there is no contradiction. For the convenience of the description of the process, the base station 10 and the user equipment 20 are described using functional block diagrams, but such devices may be implemented in hardware, software, or a combination thereof. Software operated by a processor included in the base station 10 in accordance with embodiments of the present invention and software operated by a processor included in the user equipment 20 in accordance with embodiments of the present invention may be stored in a random access memory (RAM), a flash memory (RAM), a read-only memory (ROM), an EPROM, an EEPROM, a register, a hard disk (HDD), a removable disk, a CD-ROM, a database, a server, or any other suitable storage medium, respectively.

Notification of information is not limited to the aspects/embodiments described in the disclosure, and notification of information may be made by another method. For example, notification of information may be implemented by physical layer signaling (e.g., DCI (Downlink Control Information), UCI (Uplink Control Information), higher layer signaling (e.g., RRC (Radio Resource Control) signaling, MAC (Medium Access Control) signaling, broadcast information (MIB (Master Information Block), SIB (System Information Block))), or other signals or combinations thereof. RRC signaling may be referred to as an RRC message, for example, which may be an RRC connection setup message, an RRC connection reconfiguration message, or the like.

The aspects/embodiments described in this disclosure may be applied to a system using at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), any other appropriate system, and a next generation system extended based on theses. Additionally, a plurality of systems may be combined (e.g., a combination of at least one of LTE and LTE-A and 5G) to be applied.

The processing procedures, sequences, flow charts, or the like of each aspect/embodiment described in this disclosure may be reordered, provided that there is no contradiction. For example, the methods described in this disclosure present elements of various steps in an exemplary sequence and are not limited to the particular sequence presented.

The particular operation described in this disclosure to be performed by the user equipment 20 may be performed by an upper node in some cases. It is understood that in a network formed of one or more network nodes having the user equipment 20, various operations performed for communicating with the terminal may be performed by at least one of the user equipment 20 and a network node other than the user equipment 20 (e.g., MME or S-GW can be considered, however, the network node is not limited to these). The case is exemplified above in which there is one network node other than the user equipment 20. However, the network node other than the user equipment 20 may be a combination of multiple other network nodes (e.g., MME and S-GW).

Input and output information may be stored in a specific location (e.g., memory) or managed using management tables. Input and output information may be overwritten, updated, or added. Output information may be deleted. The input information may be transmitted to another device.

The determination may be made by a value (0 or 1) represented by 1 bit, by a true or false value (Boolean: true or false), or by comparison of numerical values (e.g., a comparison with a predefined value).

The aspects/embodiments described in this disclosure may be used alone, in combination, or switched with implementation. Notification of predetermined information (e.g. "X" notice) is not limited to a method that is explicitly performed, and may also be made implicitly (e.g. "no notice of the predetermined information").

Software should be broadly interpreted to mean, regardless of whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, and so forth.

Software, instructions, information, or the like may also be transmitted and received via a transmission medium. For example, when software is transmitted from a website, server, or other remote source using at least one of wireline technology (such as coaxial cable, fiber optic cable, twisted pair, digital subscriber line) and wireless technology (e.g., infrared or microwave), at least one of these wireline technology and wireless technology is included within the definition of a transmission medium.

The information, signals, or the like described in this disclosure may be represented using any of a variety of different techniques. For example, data, instructions, commands, information, signals, bits, symbols, chips, or the like, which may be referred to throughout the above description, may be represented by voltages, currents, electromagnetic waves, magnetic fields or magnetic particles, optical fields or photons, or any combination thereof.

The terms described in this disclosure and those necessary for understanding this disclosure may be replaced by terms having the same or similar meanings. For example, at least one of the channels and the symbols may be a signal (signaling). The signal may also be a message. The component carrier may also be referred to as a carrier frequency, cell, frequency carrier, and so forth.

As used in this disclosure, the terms "system" and "network" are used interchangeably. The information, parameters, or the like described in the present disclosure may also be expressed using absolute values, relative values from predetermined values, or they may be expressed using corresponding separate information. For example, radio resources may be those indicated by an index.

The name used for the parameters described above are not restrictive in any respect. In addition, the mathematical equations using these parameters may differ from those explicitly disclosed in this disclosure. Since the various channels (e.g., PUCCH and PDCCH) and information elements can be identified by any suitable name, the various names assigned to these various channels and information elements are not in any way limiting.

In this disclosure, the terms "Base Station," "Radio Base Station," "Fixed Station," "NodeB," "eNodeB (eNB)," "gNodeB (gNB)," "Access Point," "Transmission Point," "Reception Point," "Transmission/Reception Point," "Cell," "Sector," "Cell Group," "Carrier," "Component Carrier," and the like may be used interchangeably. The base stations may be referred to as macro-cell, small-cell, femto-cell, pico-cell, or the like.

The base station can accommodate one or more (e.g., three) cells. Where the base station accommodates a plurality of cells, the entire coverage area of the base station can be divided into a plurality of smaller areas, each smaller area can also provide communication services by means of a base station subsystem (e.g., an indoor small base station (RRH) or a remote Radio Head). The term "cell" or "sector" refers to a portion or all of the coverage area of at least one of the base station and base station subsystem that provides communication services at the coverage.

In this disclosure, terms such as "mobile station (MS: Mobile Station)," "user terminal," "user equipment (UE: User Equipment)," and "terminal" may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of a base station and a mobile station may be referred to as a transmitter, receiver, communication device, or the like. At least one of a base station and a mobile station may be a device installed in a mobile body, a mobile body itself, or the like. The mobile body may be a vehicle (e.g., a car or an airplane), an unmanned mobile (e.g., a drone or an automated vehicle), or a robot (manned or unmanned). At least one of a base station and a mobile station includes a device that does not necessarily move during communication operations. For example, at least one of a base station and a mobile station may be an Internet of Things (IoT) device such as a sensor.

In addition, the base station in the present disclosure may be replaced with the user terminal. For example, various aspects/embodiments of the present disclosure may be applied to a configuration in which communication between the base stations and the user terminal is replaced with communication between multiple user terminals (e.g., may be referred to as Device-to-Device (D2D) or Vehicle-to-Everything (V2X)). In this case, a configuration may be such that the above-described function of the user equipment 20 is included in the user terminal 20. The terms "up" and "down" may also be replaced with the terms corresponding to terminal-to-terminal communication (e.g., "side"). For example, an uplink channel, a downlink channel, or the like may be replaced with a sidelink channel. Similarly, the user terminal according to the present disclosure may be replaced with a base station. In this case, a configuration may be such that, the function included in the above-described user terminal 20 may be included in the user equipment 20.

The term "connected" or "coupled" or any variation thereof means any direct or indirect connection or connection between two or more elements and may include the presence of one or more intermediate elements between two elements "connected" or "coupled" with each other. The coupling or connection between the elements may be physical, logical, or a combination of these. For example, "connection" may be replaced with "access." As used in the present disclosure, the two elements may be considered as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS (Reference Signal) or may be referred to as a pilot, depending on the standards applied.

As used in this disclosure, the expression "based on" does not mean "based on only" unless otherwise specified. In other words, the expression "based on" means both "based on only" and "at least based on."

As long as "include," "including," and variations thereof are used in this disclosure, the terms are intended to be inclusive in a manner similar to the term "comprising." Furthermore, the term "or" used in the disclosure is intended not to be an exclusive OR.

In the present disclosure, for example, if an article is added by translation, such as a, an, and the in English, the present disclosure may include that the noun following the article is plural.

In the present disclosure, the term "A and B are different" may imply that "A and B are different from each other." Note that the term may also imply "each of A and B is different from C." The terms, such as "separated" or "coupled," may also be interpreted similarly.

While the present invention is described in detail above, those skilled in the art will appreciate that the present invention is not limited to the embodiments described in the present specification. The present invention may be implemented as modifications and variations without departing from the gist and scope of the disclosure as defined by claims. Accordingly, the description of the present specification is for illustrative purposes only and is not intended to have any restrictive meaning with respect to the present invention.

LIST OF REFERENCE SYMBOLS 10 base station
110 transmitting unit
120 receiving unit
130 control unit
20 user equipment
210 transmitting unit
220 receiving unit
230 control unit
1001 processor
1002 memory
1003 storage
1004 communication device
1005 input device
1006 output device

The invention claimed is:

1. A terminal comprising:
a receiver that performs a measurement on a deactivated secondary cell; and
a processor that configures a Transmission Configuration Indication (TCI) state based on a receiving beam used at the measurement,
wherein, when there is a serving cell in a frequency band that is the same as the frequency band of the deactivated secondary cell, the receiver performs a measurement on the serving cell, and
wherein the processor configures the TCI state based on the measurement on the serving cell.

2. The terminal of claim 1, wherein the measurement is a Layer 3 measurement.

3. The terminal of claim 1, further comprising:
a transmitter that transmits a result of the measurement,
wherein the secondary cell is activated after the transmitter transmits the result of the measurement.

4. A communication method executed by a terminal, the communication method comprising:
performing a measurement on a deactivated secondary cell; and
configuring a Transmission Configuration Indication (TCI) state based on a receiving beam used at the measurement,
wherein, when there is a serving cell in a frequency band that is the same as the frequency band of the deactivated secondary cell, the performing performs a measurement on the serving cell, and
wherein the terminal configures the TCI state based on the measurement on the serving cell.

5. A system comprising:
a terminal; and
a base station,
wherein the terminal includes:
a receiver that performs a measurement on a deactivated secondary cell; and
a processor that configures a Transmission Configuration Indication (TCI) state based on a receiving beam used at the measurement,
wherein, when there is a serving cell in a frequency band that is the same as the frequency band of the deactivated secondary cell, the receiver performs a measurement on the serving cell, and
wherein the processor configures the TCI state based on the measurement on the serving cell, and
wherein the base station transmits the beam.

* * * * *